United States Patent [19]

Baker

[11] Patent Number: 4,720,171
[45] Date of Patent: Jan. 19, 1988

[54] LIQUID CRYSTAL OPTICAL SWITCHING DEVICE HAVING REDUCED CROSSTALK

[75] Inventor: Anthony P. Baker, New York, N.Y.

[73] Assignee: ITT Defense Communications, A Division of ITT Corporation, Nutley, N.J.

[21] Appl. No.: 795,155

[22] Filed: Nov. 5, 1985

[51] Int. Cl.⁴ .................. G02F 1/133; G02B 6/42
[52] U.S. Cl. ..................... 350/331 R; 350/96.14; 350/334; 350/339 R; 350/347 Y
[58] Field of Search .......... 350/347 E, 339 R, 347 Y, 350/334, 381, 331 R

[56] References Cited

U.S. PATENT DOCUMENTS 4,478,494 10/1984 Soref ..................... 350/347 E
4,556,288 12/1985 Sekimura ................. 350/339 R Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal optical switching device having reduced crosstalk includes a liquid crystal beam splitter for splitting incident light into polarized components thereof and a liquid crystal optical switch for directing those components to either a first or a second output port.

24 Claims, 3 Drawing Figures

LIQUID CRYSTAL OPTICAL SWITCHING DEVICE HAVING REDUCED CROSSTALK

CROSS-REFERENCE TO RELATED APPLICATIONS

This application is related to one, or more, of the following U.S. patent application Ser. Nos. 795,156; 795,151; 595,150; 795,149; 795,138; 795,148; 795,157; 795,154; 795,152; 795,296 all filed on even date herewith. All of the above applications are assigned to the assignee hereof.

BACKGROUND OF THE INVENTION

The present invention generally relates to a liquid crystal optical switching device and, in particular, relates to such a switching device including a liquid crystal beam splitter.

The use of optical fibers as a signal transmission medium has been demonstrated to exhibit numerous advantages compared to current transmission media, such as coaxial cable and microwave links. In a practical implementation a typical telecommunication system requires hundreds, if not thousands, of signal switches in order to serve the vast number of subscribers thereto. Conventionally, the optical switches most frequently used have been mechanical in nature.

Mechanical switches inherently include moving parts and generally require high driving power. As such, mechanical switches are inherently subject to wear, abrasion, fatigue and other mechanical stresses. As a consequence, mechanical switches are prone to failure after repeated use.

Recently, optical switches utilizing a liquid crystal material as the optical signal direction control mechanism have been proposed. However, at the present time, these proposed liquid crystal switches are both expensive and not amenable to mas production techniques.

Typical of these proposed liquid crystal switches are those discussed and described in U.S. Pat. No. 4,201,442 issued to McMahon et al. on May 6, 1980, U.S. Pat. No. 4,278,327 issued to McMahon et al. on July 14, 1981 and U.S. Pat. No. 4,385,799 issued to Soref on May 31, 1983. All of these devices require the use of a pair of trapezoidal prisms, each prism having four optically flat surfaces. Such prisms are difficult to manufacture and certainly represent a considerable expense.

In addition, such liquid crystal switches, during the assembly thereof, require that the optically flat bases of the prisms be parallel to each other and laterally aligned to ensure that the path of the light beams passing therethrough remain as stable as possible.

Further, the devices described in the above referenced patents are difficult to manufacture since each port requires individual critical alignment. Still further, since there are index of refraction mismatches at the prism/electrode interface and the electrode/liquid crystal material interface, considerable losses are introduced. These mismatches also result in excessive crosstalk between, for example, the parallel and perendicular polarizations of an inputted plane polarized light signal. Since such a light beam traverses, or is reflected by, these interfaces at least twice before exiting the device, any crosstalk due to the mismatched indices of refraction mismatches is compounded. In addition, the diffusion of the light beam and the possibility of internal scattering due to internal impurities increases with the path length within the prism.

Nevertheless, all such liquid crystal switches exhibit the advantage of no moving parts and consequently avoid numerous difficulties associated with mechanical switches.

Improved liquid crystal optical switching device that are readily mass produced are discussed and described in U.S. patent application Ser. No. 795,156 entitled LIQUID CRYSTAL OPTICAL SWITCHING DEVICE and U.S. patent application Ser. No. 795,151 entitled LIQUID CRYSTAL OPTICAL SWITCHING DEVICE HAVING MINIMIZED INTERNAL LIGHT PATH, both filed on even date herewith and assigned to the assignee hereof. These applications are deemed incorporated herein by reference. One particular drawback of the devices described in these references, is that, by themselves, they are capable of switching only a single polarization of an incident light beam. As discussed therein, this drawback can be overcome by integrating two such devices into a single apparatus and switching one of the devices to effect the optical path redirection. Nonetheless, as with any liquid crystal optical switching device, the increased light path length tends to increase crosstalk between the various ports due to such phenomena as beam diffusion, loss of polarization purity as well as other known optical effects.

Consequently, in order to fully realize the potential advantages of an optical communications system, an optical switch that provides reduced crosstalk, i.e., increased isolation between ports, is relatively inexpensive in the materials used to manufacture that switch and is amenable to mass production techniques is clearly needed.

SUMMARY OF THE INvENTION

Accordingly, it is one object of the present invention to provide a liquid crystal optical switching device having reduced crosstalk between the ports thereof.

This object is accomplished, at least in part, by a liquid crystal optical switching device including an efficient optical beam splitter utilizing a liquid crystal material.

Other objects and advantages will become apparent to those skilled in the art from the following detailed description read in conjunction with the appended claims and the drawing attached hereto.

DETAILED DESCRIPTION OF THE INVENTION

Figure 1:
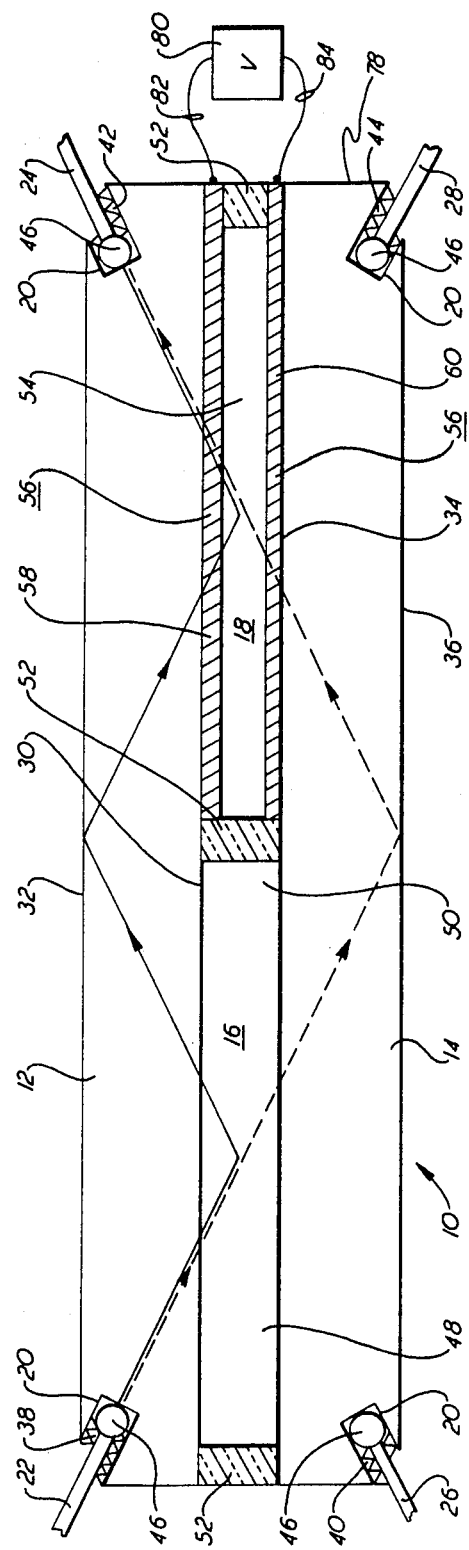
FIG. 1 is a cross sectional view, not drawn to scale, of a liquid crystal optical switching device embodying the principles of the present invention.
Figure 2:
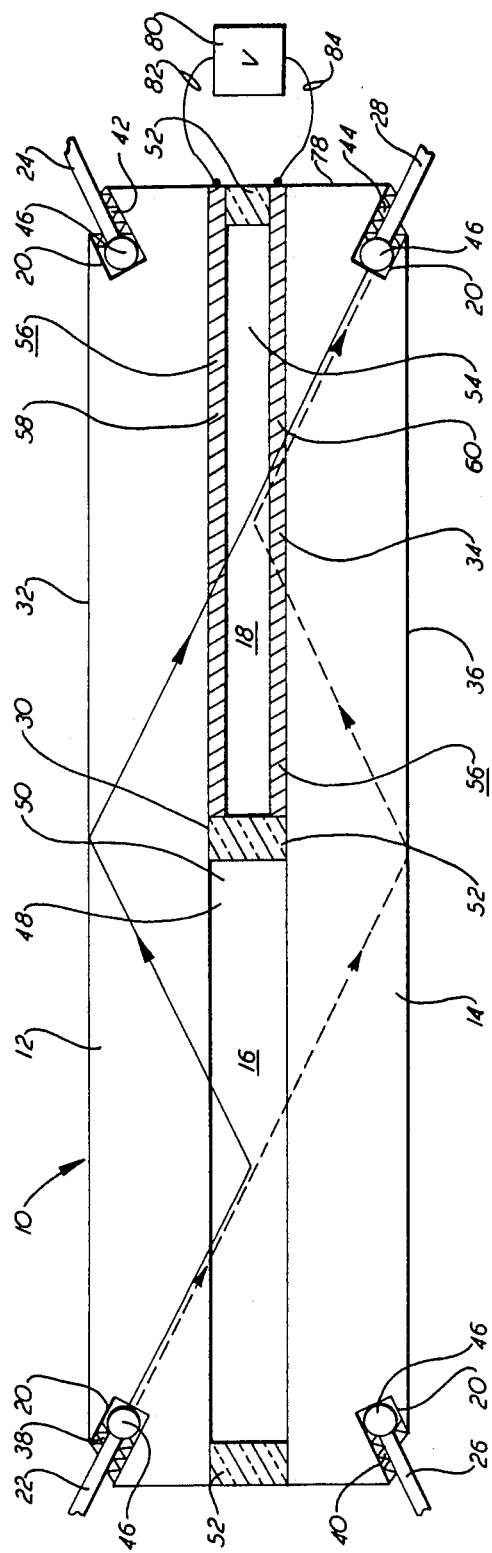
FIG. 2 is a cross sectional view, not drawn to scale, of the device shown in FIG. 1 in a second operating condition.

A liquid crystal optical switching device, generally indicated at 10 in FIGS. 1 and 2 and embodying the principles of the present invention, includes first and second transparent members, 12 and 14, respectively, means 16 for splitting an incident light beam into components, means 18 for switching the components between a first light path and a second light path, and means 20, extending into the first and second transparent members, 12 and 14, respectively, for receiving a plurality of light guides, 22, 24, 26 and 28.

In one embodiment, the first transparent member 12 includes inner and outer opposing optically flat surfaces, 30 and 32, respectively. In addition, the second transparent member 14 also includes inner and outer opposing optically flat surfaces, 34 and 36, respectively. Preferably, in one operative embodiment, each member, 12 and 14, includes and input port, 38 and 40, respectivey, and an output port, 42 and 44, respectively. The input and output ports, 38 and 42 and 40 and 44, respectively, of each member, 12 and 14, respectively, include the means 20, extending into each member, 12 and 14, for receiving optical fibers. Preferably, the means 20 includes a blind hole extending into the members, 12 and 14, at an angle larger than the critical angle whereby light entering an input port, 38 and 42, is incident upon the inner optically flat surface, 30 or 34, at the critical angle. As well known, the critical angle is that angle at which an incident light beam is totally reflected.

In addition, each of the ports, 38, 40, 42 and 44, includes a means 46 for collimating a light beam passing therethrough, such as a bead, or spherical, lens having an anti-reflection coating thereon, epoxied in position with an index of refraction matching epoxy. Further, each port, 38, 40, 42 and 44, preferably includes one of the light guides, 22, 24, 26 and 28, epoxied in the recess portion thereof and, preferably, in contact with the collimating lens. After alignment of each optical fiber, 22, 24, 26 or 28, such that the incident light is properly directed, the optical fibers, 22, 24, 26 and 28, are epoxied in place by an index of refraction matching epoxy.

Preferably, the means 16 for splitting a beam of incident light includes a first section 48 of liquid crystal material 50 having an index of refraction equal to, or greater than, that of the index of refraction of the first and second transparent members, 12 and 14, respectively and molecules homeotropically aligned to the members, 12 and 14. The section 48 of liquid crystal material 50 is retained between the first and second members, 12 and 14, by means of inert spacers 52 epoxied in place and, in one embodiment, epoxied to retain the first and second transparent members, 12 and 14, respectively, in optical alignment with respect to each other. As shown in the Figures, the means 16 for splitting a beam of light does not include any electromagnetic field sustaining means, i.e., it is electrodeless.

The means 18 for switching a light beam, in one embodiment, includes a second section 54 of liquid crystal material 50 also having the molecules homeotropically aligned and is also retained by spacers 52 similar to those retaining the first section 48 of liquid crystal material 50. The switch means 18 further includes means 56 for sustaining an electromagnetic field across the second section 54 of liquid crystal material 50. The means 56 preferably include first and second transparent electrodes, 58 and 60, respectively, spaced apart from the first and second members, 12 and 14, respectively, by an index of refraction matching means 62. Further, the electrodes, 58 and 60, are also preferably spaced apart from the liquid crystal material 50, per se, by an index of refraction matching means 64.

In one alternate embodiment, the liquid crystal material 50 in the beam splitting means 16 and the liquid crystal material 50 in the switch means 16 are co-joined and dispersed therebetween. Further, the beam splitter 16 and the switch means 18 are preferably included within a single discrete cell 66, such as that shown in FIG. 3 and more fully discussed below.

In one particular implementation, the first and second transparent members are formed from ordinary plastic and the recesses therein are formed using known techniques, such as drilling.

Preferably, nematic liquid crystal is used for both the first and second sections, 48 and 54, respectively, of liquid crystal material 50.

The electrodes, 58 and 60, are transparent and, in one embodiment, are formed by a three hundred Angstrom thick layer of Indium Tin Oxide (ITO). The thickness of each of the first and second transparent members is determined by the distance between the incident light being split and the recombining of the light components to be switched. Thus, the three optical points, of interest, can be adjusted to suit the manufacturing and application needs so long as the inherent constraint that the components from the split incident beam recombine on the switching means is maintained. Preferably, however, the components are only reflected internally a single time in the traversal thereof from the beam splitter 16 to the switch means 18. In such a manner internal reflections and beam diffusion are minimized.

In operation a light beam is inputted such that it is incident on the liquid crystal material 50 of the beam splitter 16 whereat, in one instance, the perpendicularly polarized component thereof, is reflected therefrom and the parallel polarization component is transmitted therethrough. Because the index of refraction is relatively closely matched to that of the first and second transparent members, 12 and 14, respectively, the separation, or splitting, of the perpendicular and parallel polarizations of the incident light is effectively complete, i.e., with about −90db isolation, and not reduced by internal reflections or diffractions at the member/liquid crystal material interface. Although shown in the Figures as occurring in the center of the liquid crystal material 50 the actual splitting and/or switching occurs at the surfaces of the liquid crystal material 50. That is, as is well known, the liquid crystal phenomenon, at least with respect to polarization directivity, is a surface phenomenon.

The polarized components of the incident wave are totally reflected from the outer optically flat surfaces, 32 and 36, of the first and second members, 12 and 14, respectively, thereby being redirecting to a point of convergence in the switching means 18. The potential applied to the electrodes, 58 and 60, of the switching means 18 determines the output port, 42 or 44, to which the recombined components of the incident light beam are directed.

Although the present discussion designates that the incident light beam is initially directed onto the beam splitter 16, it is to be understood that the device 10 is completely bidirectional in the operation thereof.

Figure 3:
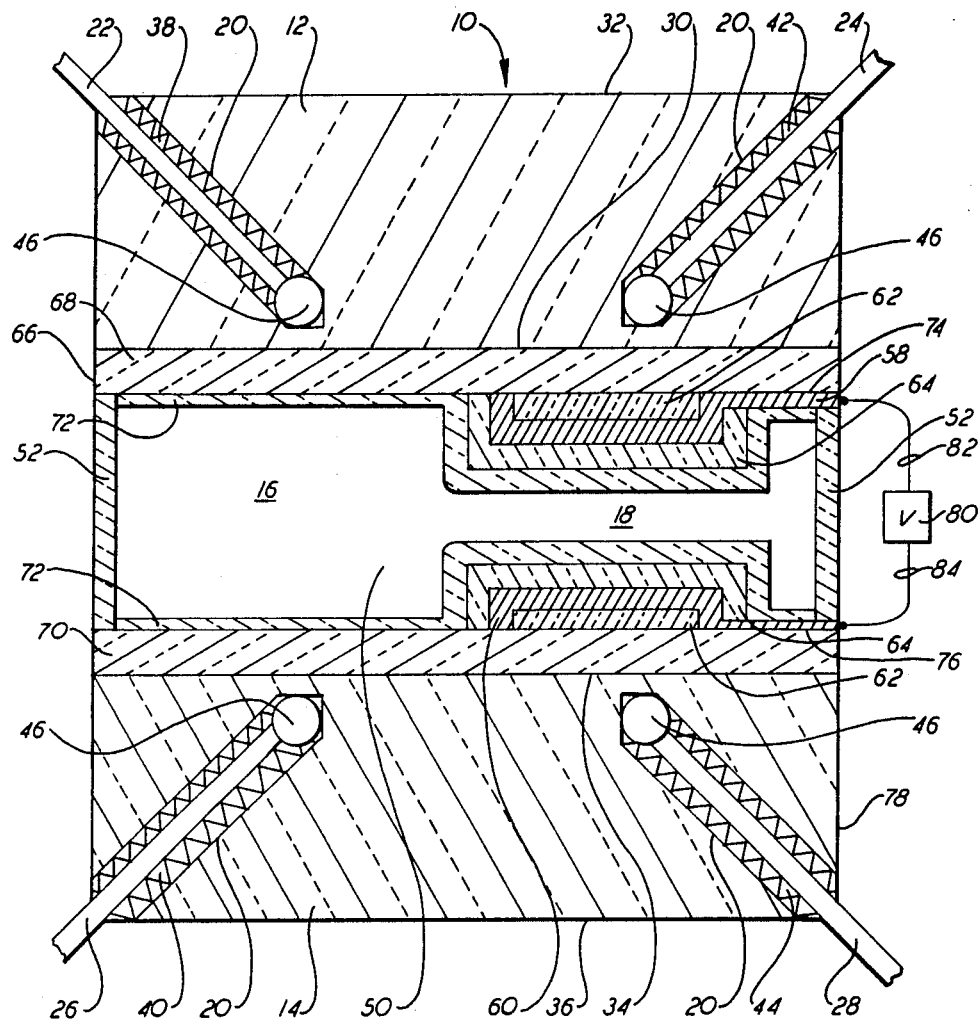
FIG. 3 is a cross sectional view, not drawn to scale, of another embodiment of the present invention including a discrete liquid crystal cell.

With reference to FIG. 3, there is shown a discrete liquid crystal beam splitter switch cell 66 particularly useful in the optical switch 10 shown in FIG. 1. One such discrete cell is fully discussed and described in U.S. patent application Ser. No. 795,150 entitled LIQUID CRYSTAL CELL FOR USE IN AN OPTICAL SWITCH filed on even date herewith and assigned to the assignee hereof. This patent application is deemed incorporated here in by reference.

In essence, the cell 66 includes first and second transparent slides, 68 and 70, respectively, that are spaced apart and retained by inert spacers 52 epoxied in position by an epoxy that is inert to the liquid crystal material 50. The slides, 68 and 70, in one particular embodiment, would need only to be attached to the first and second transparent members, 12 and 14, respectively, to form the device 10 shown in FIGS. 1 and 2. Structurally, the discrete cell 66 includes the beam splitter 16 including a layer 72 of molecule aligning surfactant underlying each of the transparent slides, 68 and 70. The discrete cell 66 also includes the switch means 18 having the transparent electrodes, 58 and 60, underlying each inner surface, 74 and 76, of the slides, 68 and 70, respectively. Further, as shown in FIG. 3, the switch means 18 is provided with a means for reducing optical losses that includes at least one layer of refraction index matching means 62 between each glass slide, 68 and 70, and the respective electrode, 58 and 60. In addition, the second layer 64 of refraction index matching material overlies each electrode, 58 and 60, and is spaced apart from the liquid crystal material 50 by the overlying molecular alignment surfactant 72.

In either embodiment, the electrodes, 58 and 60, preferably extend to one edge 78 of the device 10 whereat connection can be made to a voltage control source 80 by means of electrically conductive leads, 82 and 84, epoxied to each electrode, 58 and 60, respectively.

Because the incident beam is more completely split into the perpendicular and parallel components thereof by the liquid crystal beam splitter 16 than other types of beam splitters, the resulting unwanted components within each of the polarizations propagating through the switch means 18 are significantly reduced. Hence, crosstalk between the perpendicular and parallel polarized portion components of the incident light beam is substantially completely eliminated.

Although the present invention has been described herein with respect to specific exemplary embodiments, other arrangements and configurations may become apparent to those skilled in the art that do not depart from the spirit and scope of the present invention. Hence, the present invention is deemed limited only by the appended claims and the reasonable interpretation thereof.

What is claimed is:

1. A liquid crystal optical switching device; said device comprises:
    a first transparent member having inner and outer opposing optically flat surfaces;
    a second transparent member having inner and outer opposing optically flat surfaces;
    means, extending into said first and second members for receiving a plurality of optical fibers;
    means, disposed between an electrodeless first section of said inner surfaces of said first and second transparent members, for splitting a light beam impinging thereon into components said first section including liquid crystal material therebetween; and
    means, disposed between a second section of said inner surfaces of said first and second transparent members, for selectively directing said components of a light beam impinging thereon between a first port and a second port, said second section including liquid crystal material therebetween.

2. Device as claimed in claim 1 wherein said directing means further includes:
    means for sustaining an electromagnetic field in said liquid crystal material between said second section of said inner surfaces.

3. Device as claimed in claim 2 wherein said electromagnetic field sustaining means overlies a portion of one of said inner surface of said transparent members.

4. Device as claimed in claim 3 wherein said electromagnetic field sustaining means includes:
    a first electrode, said first electrode overlying said inner surface of said first member; and
    a second electrode, said second electrode overlying said inner surface of said second member.

5. Device as claimed in claim 4 further comprising:
    means, disposed between each electrode and each underlying inner surface, for reducing optical losses within said cell.

6. Device as claimed in claim 5 wherein said optical loss reducing means between said electrodes and said inner surfaces includes a transparent material having an index of refraction gradient thereacross, said index of refraction gradient being substantially matched to said electrodes proximate the interface therebetween and substantially matched to said members proximate the interface therebetween.

7. Device as claimed in claim 5 further comprising:
    means, overlying each said electrode, for reducing optical losses within said device.

8. Device as claimed in claim 7 wherein each said optical loss reducing means overlying said electrodes includes a transparent material having an index of refraction gradient thereacross, said index of refraction gradient being substantially matched to said electrodes proximate the interface therebetween and substantially matched to said liquid crystal material proximate said liquid crystal material.

9. Device as claimed in claim 8 wherein said optical loss reducing means between said electrodes and said inner surfaces includes a transparent material having an index of refraction gradient thereacross, said index of refraction gradient being substantially matched to said electrodes proximate the interface therebetween and substantially matched to said members proximate the interface therebetween.

10. Device as claimed in claim 1 further comprising:
    means for orienting the molecules of said liquid crystal material.

11. Device as claimed in claim 10 wherein said molecule orienting means comprises:
    a layer of a surfactant, said surfactant overlying said inner surfaces of said members.

12. Device as claimed in claim 1 further comprising:
    a discrete liquid crystal cell, said cell including said electrodeless liquid crystal light beam splitting means and said selective directing means.

13. Device as claimed in claim 12 wherein said discrete liquid crystal cell comprises:
    first and second transparent slides, said slides being spaced apart, each said slide having an inner surface and an outer surface;
    means, overlying each said inner surface, for reducing optical losses within said cell; and
    means for retaining a liquid crystal material between said inner surfaces of said first and second transparent slides.

14. Device as claimed in claim 13 further comprising:
    means for orienting the molecules of said liquid crystal material.

15. Device as claimed in claim 14 wherein said molecule orienting means comprises:
a layer of a surfactant, said surfactant overlying said inner surfaces of said slides.

16. Device as claimed in claim 13 wherein said liquid crystal retaining means includes:
a plurality of spacers, said spacers being inert to said liquid crystal material and spaced about the periphery of said cell; and
means for retaining said slides to said spacers whereby said slides are laterally and longitudinally fixed with respect to each other.

17. Device as claimed in claim 13 further comprising:
means for sustaining an electromagnetic field in said liquid crystal material.

18. Device as claimed in claim 17 wherein said electromagnetic field sustaining means overlies a portion of one of said inner surface of said transparent slides.

19. Device as claimed in claim 17 wherein said electromagnetic field sustaining means includes:
a first electrode, said first electrode overlying said inner surface of said first slide; and
a second electrode, said second electrode overlying said inner surface of said second slide.

20. Device as claimed in claim 19 further comprising:
means, disposed between each electrode and each underlying inner surface, for reducing optical losses within said cell.

21. Device as claimed in claim 20 wherein said optical loss reducing means between said electrodes and said inner surfaces includes a transparent material having an index of refraction gradient thereacross, said index of refraction gradient being substantially matched to said electrodes proximate the interface therebetween and substantially matched to said slides proximate the interface therebetween.

22. Device as claimed in claim 20 further comprising:
means, overlying each said electrode, for reducing optical losses within said cell.

23. Device as claimed in claim 22 wherein each said optical loss reducing means overlying said electrodes includes a transparent material having an index of refraction gradient thereacross, said index of refraction gradient being substantially matched to said electrodes proximate the interface therebetween and substantially matched to said liquid crystal material proximate said liquid crystal material.

24. Device as claimed in claim 23 wherein said optical loss reducing means between said electrodes and said inner surfaces includes a transparent material having an index of refraction gradient thereacross, said index of refraction gradient being substantially matched to said electrodes proximate the interface therebetween and substantially matched to said slides proximate the interface therebetween.

* * * * *